(12) United States Patent
Inoue

(10) Patent No.: US 8,357,255 B2
(45) Date of Patent: Jan. 22, 2013

(54) PNEUMATIC TIRE MANUFACTURING METHOD AND PNEUMATIC TIRE

(75) Inventor: Harutaka Inoue, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 329 days.

(21) Appl. No.: 12/689,563

(22) Filed: Jan. 19, 2010

(65) Prior Publication Data

US 2010/0181003 A1    Jul. 22, 2010

(30) Foreign Application Priority Data

Jan. 19, 2009   (JP) .................................. 2009-008779

(51) Int. Cl.
*B29D 30/00* (2006.01)
*B29D 30/08* (2006.01)
*B29D 30/20* (2006.01)
*B29D 30/36* (2006.01)

(52) U.S. Cl. ...................... 156/110.1; 156/123; 156/124; 156/133

(58) Field of Classification Search .................. 156/133, 156/110.1, 123, 124
See application file for complete search history.

(56) References Cited

U.S. PATENT DOCUMENTS

2006/0094829 A1 * 5/2006 Chino et al. .................. 525/301

FOREIGN PATENT DOCUMENTS

| DE | 69708336 T2 | | 7/2002 |
| EP | 761478 | * | 3/1997 |
| GB | 1509606 | * | 5/1978 |
| WO | WO-98/38049 A1 | | 9/1998 |
| WO | WO-2005/007423 A1 | | 1/2005 |
| WO | WO-2008/029779 A1 | | 3/2008 |

* cited by examiner

*Primary Examiner* — Justin Fischer
(74) *Attorney, Agent, or Firm* — Connolly Bove Lodge & Hutz LLP

(57) ABSTRACT

Provided are a pneumatic tire manufacturing method and a pneumatic tire capable of improving separation failure of a tire component member made of either a thermoplastic resin or a thermoplastic elastomer composition. The method and the pneumatic tire have the following configuration. A green tire is formed by radially expanding a carcass band 13 which is formed on a making drum 21 and which includes an annular tire component member 10 made of any one of a thermoplastic resin and a thermoplastic elastomer composition produced by blending a thermoplastic resin component and an elastomer component. The tire component member 10 is formed of plural layers 10A, 10B, 10C that are stacked on one another. After the inner-side layer 10A (10B) is attached, the making drum 21 is radially expanded by a predetermined amount and then the outer-side layer 10B (10C) is attached onto the inner-side layer 10A (10B).

17 Claims, 3 Drawing Sheets

PNEUMATIC TIRE MANUFACTURING METHOD AND PNEUMATIC TIRE

CROSS REFERENCE TO RELATED APPLICATIONS

This application claims priority to JP2009-008779 filed Jan. 19, 2009 which is hereby incorporated by reference.

BACKGROUND OF THE INVENTION

1. Field of the Invention

The present invention relates to a pneumatic tire manufacturing method and a pneumatic tire. More specifically, the present invention relates to a pneumatic tire manufacturing method and a pneumatic tire capable of improving separation failure of a tire component member made of either a thermoplastic resin or a thermoplastic elastomer composition.

2. Description of the Prior Art

A conventionally known pneumatic tire includes an inner liner layer that is not made of rubber but is made of either a thermoplastic resin or a thermoplastic elastomer composition produced by blending a thermoplastic resin component and an elastomer component (see, for example, Patent Document). The use of such a material has an advantage of making the inner liner layer lighter in weight and of improving the mileage.

An inner liner layer made of ether a thermoplastic resin or a thermoplastic elastomer composition, however, is more rigid than an inner liner layer made of rubber. Such a rigid inner liner layer may be a cause of tire failure, when a green tire is formed by expanding radially a carcass band, the setting of a too large lift-deformation ratio (radial-expansion ratio) causes a phenomenon of elastic resilience to generate, in turn, a phenomenon of inner liner layer separation. The failure caused by such separation is more likely to occur in tires with a lift-deformation ratio higher than 160%, such as high profile tires, heavy-load tires, aircraft tires, and construction vehicle tires.

[Patent Document] Internation patent application publication WO2005/007423

SUMMARY OF THE INVENTION

An object of the present invention is to provide a pneumatic tire manufacturing method and a pneumatic tire capable of improving separation failure of a tire component member made of either a thermoplastic resin or a thermoplastic elastomer composition.

A pneumatic tire manufacturing method of the present invention to achieve the object includes a step of forming a green tire by radially expanding a carcass band formed on a making drum and having an annular tire component member made of any one of a thermoplastic resin and a thermoplastic elastomer composition produced by blending a thermoplastic resin component with an elastomer component. In the pneumatic tire manufacturing method, the tire component member is formed of a plurality of layers stacked on one another, and after an inner-side layer of the plurality of layers is attached, the making drum is radially expanded by a predetermined amount and then a layer on the outer side of the inner-side layer is attached onto the inner-side layer.

A pneumatic tire of the present invention includes an inner liner layer made of any one of a thermoplastic resin and a thermoplastic elastomer composition produced by blending a thermoplastic resin component with an elastomer component. In the pneumatic tire, the inner liner layer is formed of a plurality of layers stacked on one another from the inner side of the tire to the outer side thereof, and among the plurality of layers, a layer on an outer side of the tire has a larger thickness and/or a higher modulus of elasticity.

According to the present invention described above, the tire component member made of either a thermoplastic resin or a thermoplastic elastomer composition is formed of the plural layers. Accordingly, each layer has lower rigidity. With these lower rigid layers, after an inner-side layer of the plural layers is attached, the making drum is radially expanded by a predetermined amount and then a layer on the outer side of the inner-side layer is attached onto the inner-side layer. Thus, the amount of radial expansion of the outer-side layer, which greatly affects the separation caused by the elastic resilience phenomenon, can be reduced at the time of the radial expansion of the carcass band. Consequently, it is possible to improve the separation failure.

DESCRIPTION OF THE PREFERRED EMBODIMENT

Hereinafter, an embodiment of the present invention will be described in detail with reference to the accompanying drawings.

Figure 1:
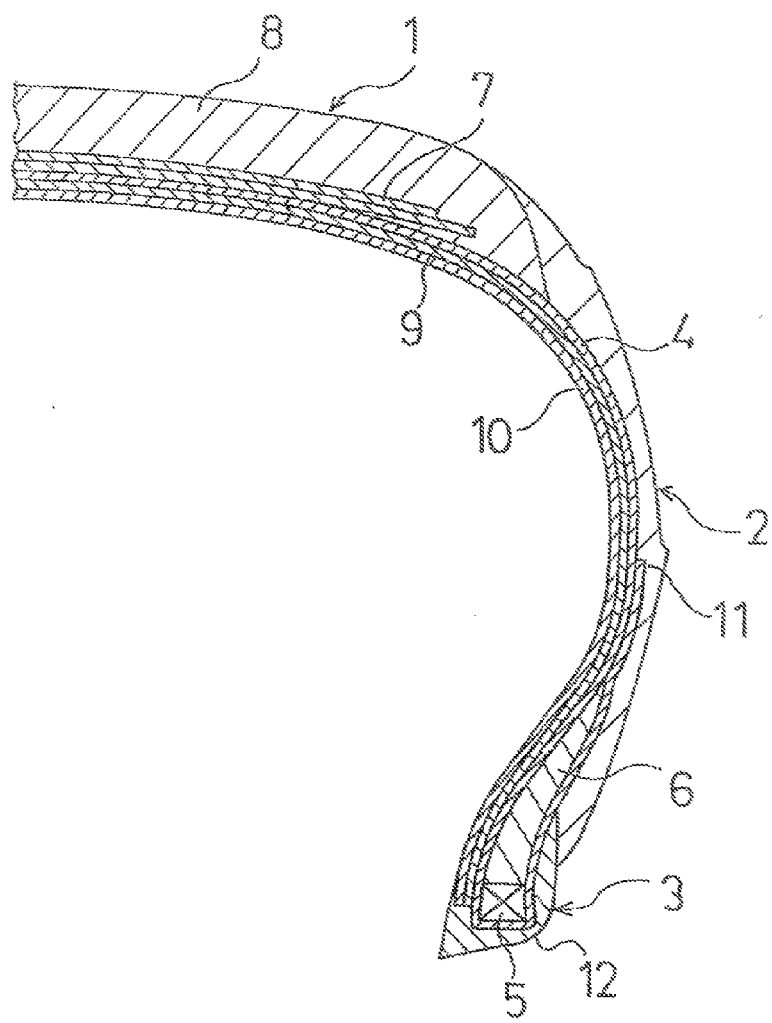
FIG. 1 is a tire meridian cross-sectional view illustrating a part of pneumatic tire according to an embodiment of the present invention.

FIG. 1 illustrates a pneumatic tire according to an embodiment of the present invention. In FIG. 1, reference numeral 1 denotes a tread portion, reference numeral 2 denotes a sidewall portion, and reference numeral 3 denotes a bead portion.

A carcass layer 4 extends between the right and left bead portions 3. In the carcass layer, reinforcing cords each of which extends in the radial direction of the tire are arranged in the circumferential direction of the tire at a predetermined intervals are embedded in a rubber layer. Each of the two end portions of the carcass layer 4 is folded back from the inner side in the axis direction of the tire to the outer side. The carcass layer 4 thus folded is wrapped around a bead core 5 buried in the bead portion 3, so as to sandwich a bead filler 6.

In the tread portion 1, plural belt layers 7 are provided at the outer circumferential side of the carcass layer 4. A tread rubber layer 8 is provided at the outer circumferential side of the belt layers 7. A tie rubber 9 is provided at the inner side of the carcass layer 4, and an inner liner layer 10 is provided at the inner side of the tie rubber layer 9. The inner liner layer 10 is a film-like layer made of either a thermoplastic resin or a thermoplastic elastomer composition in which a thermoplastic resin component and an elastomer component are blended together.

Figure 2:
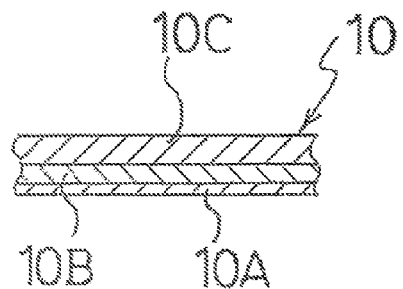
FIG. 2 is an enlarged view illustrating a part of an inner liner layer.

As FIG. 2 shows, the inner liner layer 10 includes plural layers 10A, 10B, 10C all of which have the same modulus of elasticity. The plural layers 10A, 10B, 10C are stacked on one another from the inner side of the tire to the outer side thereof. The layer located on the innermost side is referred to as the innermost layer 10A. The layer that is located at the immediately outer side of the innermost layer 10A is referred to as the second layer 10B. The layer that is located at the immediately outer side of the second layer 10B is referred to as the third layer 10C. The outer side a layer is located at, the thicker the layer becomes. The number of layers included in the inner liner layer 10 is three in the example shown in FIG. 2, but either two or more than four layers may be included in the inner liner layer 10. The number of layers may be selected appropriately by taking account of the size or the type of the tire.

A side rubber layer 11 is provided at the outer side of the carcass layer 4 of the sidewall portion 2. A rib cushion rubber layer 12 is provided at the outer side of the folded-back portion of the carcass layer 4 of the bead portion 3.

Hereinafter, a method of manufacturing the pneumatic tire of FIG. 1 by a manufacturing method of the present invention will be described in detail with reference to FIGS. 3 to 7.

Figure 3:
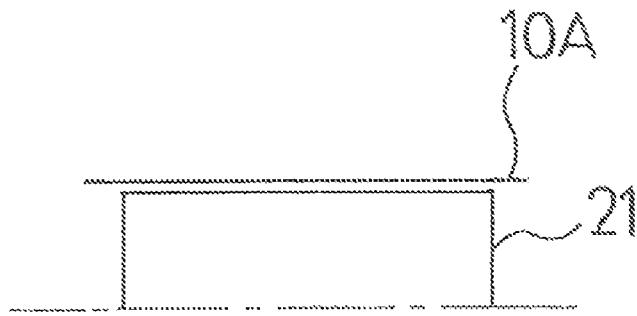
FIG. 3 is a diagram for describing a step of attaching the innermost one of inner liner layers in a pneumatic tire manufacturing method according to an embodiment of the present invention.
Figure 4:
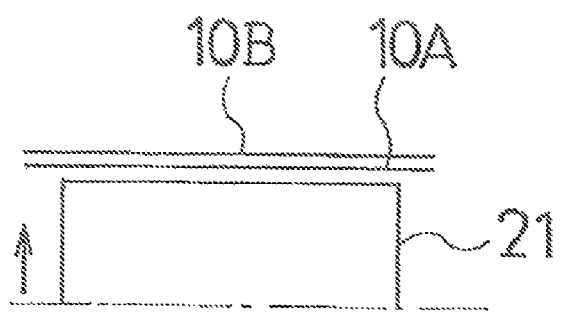
FIG. 4 is a diagram for describing a step of attaching the second one of the inner liner layers in the pneumatic tire manufacturing method according to the embodiment of the present invention.

To begin with, as FIG. 3 shows, the innermost layer 10A of the tube-shaped inner liner layer is mounted on a making drum 21. The innermost layer 10A is made of either a thermoplastic resin or a thermoplastic elastomer composition. Then, as FIG. 4 shows, the making drum is expanded radially by a predetermined amount. The amount of this radial expansion can be selected appropriately for the thickness of the second layer 10B. For example, the amount of the radial expansion can be set at 110% (relative to the radius of the making drum 21 with the innermost layer 10A attached thereto). After the radial expansion, the belt-shaped second layer 10B that is thicker than the innermost layer 10A is wrapped around on the outer circumference of the innermost layer 10A so as to form a ring shape. The second layer 10B is thus bonded to the innermost layer 10A.

Figure 5:
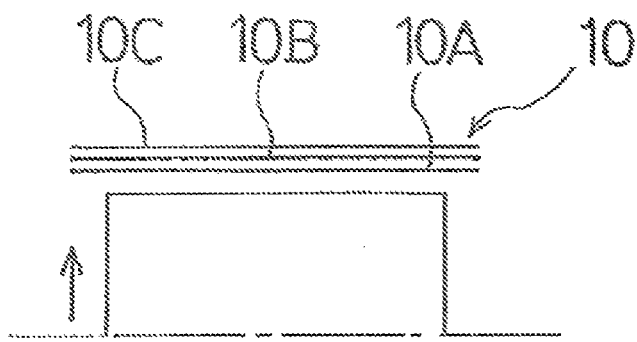
FIG. 5 is a diagram for describing a step of attaching the third one of the inner liner layers in the pneumatic tire manufacturing method according to the embodiment of the present invention.
Figure 6:
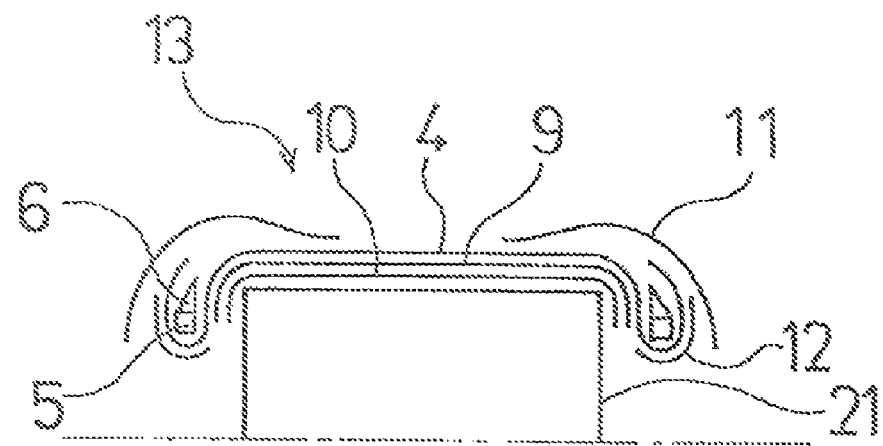
FIG. 6 is a diagram for describing a state in which a carcass band is formed on a making drum in the pneumatic tire manufacturing method according to the embodiment of the present invention.

Then, as FIG. 5 shows, the making drum is further expanded radially by a predetermined amount. The amount of this radial expansion can be selected appropriately for the thickness of the third layer 100. For example, the amount of the radial expansion can be set at 120% (relative to the radius of the making drum 21 with the innermost layer 10A attached thereto). After the radial expansion, the belt-shaped third layer 100 that is thicker than the second layer 10B is wrapped around on the outer circumference of the second layer 10B so as to form a ring shape. The third layer 100 is thus bonded to the second layer 10B. In this way, the tube-shaped inner liner layer 10 made of either a thermoplastic resin or a thermoplastic elastomer composition is formed on the making drum 21.

An adhesive agent is applied to the surface of the third layer 100. After that, in a similar manner to that in the case of the conventional method, the unvulcanized tie rubber layer 9, the unvulcanized carcass layer 4, the bead core 5 to which the unvulcanized bead filler 6 is attached, the unvulcanized rim cushion rubber layer 12, the unvulcanized side rubber layer 11 are attached sequentially. Thus formed is a tube-shaped carcass band 13 (see FIG. 6).

Figure 7:
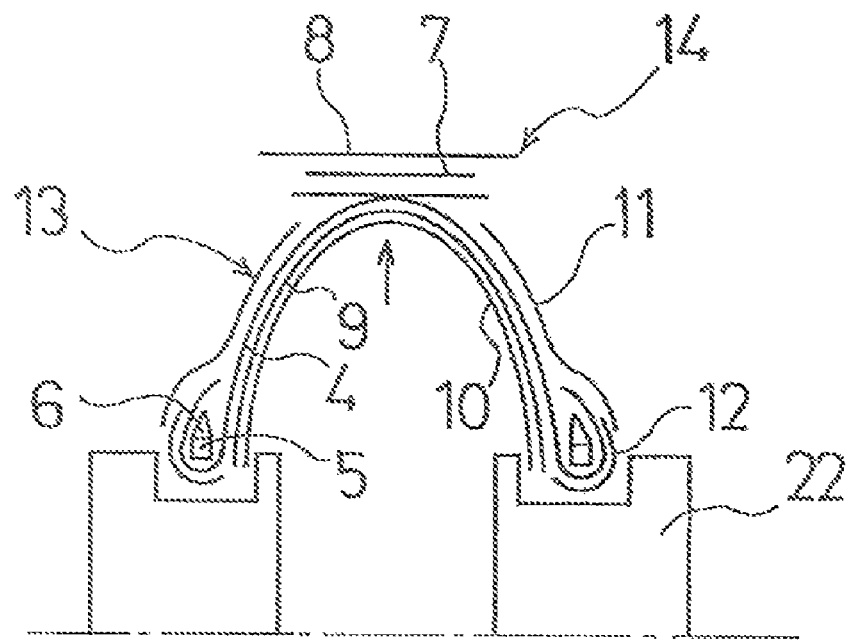
FIG. 7 is a diagram for describing a step of forming a green tire by expanding a carcass band in the pneumatic tire manufacturing method according to the embodiment of the present invention.

Then the carcass band 13 is dismounted from the making drum 21. As FIG. 7 shows, the carcass band 13 is mounted on a shaping drum 22, and then an internal pressure is applied to the carcass band 13. The internal pressure expands the carcass band 13 into a toroidal shape. The carcass band 13 thus expanded is pressed and bonded onto the inner circumference of an annular belt band 14. The belt band 14 is provided at the outer circumferential side of the carcass band 13, and is made by bonding the unvulcanized tread rubber layer 8 onto the outer circumference of the unvulcanized belt layer 7. Thus, the formation of a green tire is completed. The green tire is then vulcanized by being pressurized and being heated within the mold. Thus obtained is the pneumatic tire shown in FIG. 1.

According to the present invention described above, the inner liner layer 10 includes the plural layers 10A, 10B, 10C. Accordingly, each layer has lower rigidity. With these less rigid layers 10A, 10B, 10C, after the inner-side layer 10A (10B) is attached, the making drum 21 is radially expanded by a predetermined amount and then the outer-side layer 10B (10C) is attached onto the inner-side layer 10A (10B). Thus, the amount of radial expansion of the outer-side layer, which greatly affects the separation from the tie rubber layer 9 caused by the elastic resilience phenomenon, can be reduced at the time of the radial expansion of the carcass band. Consequently, it is possible to improve the separation failure in which the inner liner layer 10 is separated from the tie rubber layer 9.

The occurrence of the elastic resilience phenomenon is prevented by the fact that after the inner-side layer 10A (10B) is attached, the making drum 21 is radially expanded by a predetermined amount and then the outer-side layer 10B (10C) is attached onto the inner-side layer 10A (10B). In addition, the outer-side layer can be made thicker than the inner-side layer according to the present invention described above. For this reason, the present invention has an advantage. Specifically, the inner liner layer 10 that is thick enough to have a desired property (resistance against air-permeation) can be formed by minimum rounds of radial expansion of the making drum 1.

According to the present invention, a preferable thickness of the innermost layer 10A is not larger than 150 μm. A thickness of the innermost layer 10A exceeding 150 μm makes it difficult for the innermost layer 10A to follow a large lift deformation of 160% or higher radial expansion ratio of a carcass band 13 at the position of the innermost layer 10A. A more preferable thickness is 100 μm or smaller. In view of the productivity, the innermost layer 10A preferably has a thickness of at least 40 μm.

A preferable radial expansion ratio of the making drum 21 at the time of attaching the outermost third layer 10C is not higher than 130% of the radius of the making drum 21 at the time when the innermost layer 10A is attached. A radial expansion ratio exceeding 130% causes wrinkles to be formed in each of the end portions of the inner liner layer 10, which is reduced in radius when the bead core 5 is attached. The wrinkles in turn cause air pockets to be formed. A more preferable radial expansion ratio is 120% or lower.

The plural layers 10A, 10B, 10C of the inner liner layer 10 are made respectively of materials having the same modulus of elasticity. However, the layers 10A, 10B, 10C may be made respectively of materials that differ from one another in the modulus of elasticity. In this case, the outer-side layer preferably has a higher modulus of elasticity than the inner-side layer for the same reason described above. The layers that differ from one another in the modulus of elasticity may have the same thickness. Alternatively, the variation in the modulus of elasticity may be combined with the variation in the thickness. That is, the outer-side layer may have both a larger thickness and a higher modulus of elasticity than the inner-side layer has.

The modulus of elasticity (storage elasticity) of the thermoplastic resin or the thermoplastic elastomer composition used for each of the plural layers 10A, 10B, 10C of the inner liner layer 10 preferably ranges from 1 to 500 MPa. A lower modulus of elasticity than 1 MPa causes wrinkles to be formed when the green tire is formed, worsening the forming processability. Conversely, a modulus of elasticity exceeding 500 MPa has bad effect on durability. A more preferable modulus of elasticity ranges from 25 to 400 MPa. The "storage elasticity" mentioned above refers to the storage elasticity measured under the conditions of a static strain of 10%, a dynamic strain of ±10%, a frequency of 20 Hz, a temperature of 20° C. and by use of a viscoelasticity spectrometer manufactured by Toyo Seiki Seisaku-sho Ltd.

The coefficient of air permeability of the thermoplastic resin or the thermoplastic elastomer composition used for each of the plural layers 10A, 10B, 10C of the inner liner layer 10 is preferably $25 \times 10^{-12}$ cc·cm/cm$^2$·sec·cmHg or smaller. A coefficient of air permeability exceeding $25 \times 10^{-12}$ cc·cm/cm$^2$·sec·cmHg requires an increase in the thickness of these layers 10A, 10B, 10C for the purpose of maintaining the internal pressure. The thicker inner liner layer 10 is not favorable if the tire has to be as light in weight as possible.

In the present invention, examples of the thermoplastic resin for use in the aforementioned inner liner layer 10 include: polyamide resins (for example, nylon 6 (N6), nylon 66 (N66), nylon 46 (N46), nylon 11 (N11), nylon 12 (N12), nylon 610 (N610), nylon 612 (N612), nylon 6/66 copolymers (N6/66), nylon 6/66/610 copolymers (N6/66/610), nylon MXD6 (MXD6), nylon 6T, nylon 6/6T copolymers, nylon 66/PP copolymers, and nylon 66/PPS copolymers); their N-alkoxyalkylated products (for example, methoxymethylated nylon 6, methoxymethylated nylon 6/610 copolymers, and methoxymethylated nylon 612); polyester resins (for example, aromatic polyesters, such as polybutylene terephthalate (PBT), polyethylene terephthalate (PET), polyethylene isophthalate (PEI), PET/PEI copolymers, polyarylate (PAR), polybutylene naphthalate (PBN), liquid crystal polyester, and polyoxyalkylene diimide diacid/polybutylene terephthalate copolymers); polynitrile resins (for example, polyacrylonitrile (PAN), polymethacrylonitrile, acrylonitrile/styrene copolymers (AS), (meth)acrylonitrile/styrene copolymers, and (meth)acrylonitrile/styrene/butadiene copolymers); polymethacrylate resins (for example, polymethyl methacrylate (PMMA), oolyethylmethacrylate); polyvinyl resins (for example, polyvinyl acetate, polyvinyl alcohol (PVA), vinyl alcohol/ethylene copolymers (EVOH), polyvinylidene chloride (PVDC), polyvinyl chloride (PVC), vinyl chloride/vinylidene chloride copolymers, vinylidene chloride/methyl acrylate copolymers, vinylidene chloride/acrylonitrile copolymers); cellulose resins (for example, cellulose acetate, and cellulose acetate butyrate); fluororesins (for example, polyvinylidene fluoride (PVDF), polyvinyl fluoride (PVF), polychlorotrifluoroethylene (PCTFE), and ethylene/tetrafluoroethylene copolymers); and imide resins (for example, aromatic polyimide (PI)).

The thermoplastic elastomer composition may be produced by blending a thermoplastic resin component and an elastomer component. Favorable examples of the elastomer for use include: diene rubbers and their hydrogenated products (for example, natural rubbers (NR), isoprene rubber (IR), epoxidized natural rubbers, styrene-butadiene rubber (SBR), butadiene rubbers (BR, high-cis BR and low-cis BR), nitrile rubber (NBR), hydrogenated NBR, and hydrogenated SBR); olefin rubbers (for example, ethylene propylene rubbers (EPDM and EPM), maleic acid-modified ethylene propylene rubber (M-EPM), butyl rubber (IIR), copolymers of isobutylene and aromatic vinyl or diene monomer, acrylic rubber (ACM), and ionomers); halogen-containing rubbers (for example, Br-IIR, Cl-IIR, brominated isobutylene-p-methylstyrene copolymers (Br-IPMS), chloroprene rubber (CR), hydrin rubber (CHR), chlorosulfonated polyethylene rubber (CSM), chlorinated polyethylene rubber (CM), and maleic acid-modified chlorinated polyethylene rubber (M-CM)); silicone rubbers (for example, methyl vinyl silicone rubber, dimethyl silicone rubber, and methylphenylvinyl silicone rubber); sulfur-containing rubbers (for example, polysulfide rubber); fluororubbers (for example, vinylidene fluoride rubbers, fluorine-containing vinyl ether rubbers, tetrafluoroethylene-propylene rubbers, fluorine-containing silicone rubbers, and fluorine-containing phosphazene rubbers); and thermoplastic elastomers (for example, styrene elastomers, olefin elastomers, ester elastomers, urethane elastomers, and polyamide elastomers).

If a particular thermoplastic resin among those described above is incompatible with such an elastomer, a compatibilizer may be used as a third component appropriately to make the two compatible with each other. Mixing such a compatibilizer into the blend system of the thermoplastic resin and the elastomer reduces the interfacial tension between the thermoplastic resin and the elastomer component. As a result, the rubber particles constituting the dispersion phase is made finer, so that both components can exhibit their characteristics more effectively. In general, such a compatibilizer has a copolymer structure of at least one of the thermoplastic resin and the elastomer component, or a copolymer structure having an epoxy group, a carbonyl group, a halogen group, an amino group, an oxazoline group, or a hydroxyl group, which is capable of reacting with the thermoplastic resin or the elastomer component. The compatibilizer can be selected depending on the types of the thermoplastic resin and the elastomer component to be mixed therewith. Examples of the compatibilizer normally used to this end include styrene/ethylene-butylene-styrene block copolymers (SEBS) and their maleic acid-modified products, EPDM, EPM, EPDM/styrene or EPDM/acrylonitrile graft copolymers and their maleic acid-modified products, styrene/maleic acid copolymers, reactive phenoxine, and the like. The blending proportion of such a compatibilizer is not particularly limited. The blending proportion of such a compatibilizer may preferably be 0.5 to 10 parts by weight relative to 100 parts by weight of the polymer components (the total amount of the thermoplastic resin and the elastomer component).

If a thermoplastic resin and an elastomer are blended together, the proportion of a particular thermoplastic resin component (A) to a particular elastomer component (B) is not limited to a particular proportion. Rather, it is possible to determine the proportion by taking account of the balance among the thickness of the film, the resistance against air permeation, and the flexibility. A preferable proportion by weight (A)/(B) ranges from 10/90 to 90/10. A more preferable proportion (A)/(B) ranges from 15/85 to 90/10.

Besides the above-mentioned essential polymer components, other polymers may be mixed with the thermoplastic elastomer composition according to the present invention. If such other polymers are mixed, cares have to be taken not to impair the necessary properties of the thermoplastic elastomer composition for the tire of the present invention. The above-mentioned compatibilizer polymer is an example of such other polymers. The purposes of mixing such a polymer are to improve the compatibility between the thermoplastic resin and the elastomer, to improve the molding processability of the material for the film, to improve the heat resistance, to reduce cost, and so on. Examples of the material used for the polymer include polyethylene (PE), polypropylene (PP), polystyrene (PS), ABS, SBS, and polycarbonate (PC). In addition, a filler (calcium carbonate, titanium oxide, alumina, or the like) generally blended with a polymer blend, a reinforcement such as carbon black and white carbon, a softener, a plasticizer, a processing aid, a pigment, a dye, an anti-degradant, or the like can be blended optionally with the inner liner layer as long as such an agent does not harm the characteristic required as the band member 3.

When mixed with the thermoplastic resin, the aforementioned elastomer component can be dynamically vulcanized. When the aforementioned elastomer component is dynamically vulcanized, a vulcanizer, a vulcanization assistant, vulcanization conditions (temperature and time), and the like, can be determined as appropriate in accordance with the composition of the elastomer component to be added, and are not particularly limited.

As the vulcanizer, a generally-available rubber vulcanizer (crosslinking agent) can be used. Specifically, examples of a sulfur-based vulcanizer include a sulfur powder, precipitated sulfur, highly dispersible sulfur, surface-treated sulfur, non-soluble sulfur, dimorpholin disulfide, and alkylphenol disulfide. Such a vulcanizer can be used in an amount of, for example, approximately 0.5 to 4 phr. Herein, "phr" refers to parts by weight per 100 parts by weight of the rubber (elastomer) component.

Examples of an organic peroxide-based vulcanizer include benzoil peroxide, t-butylhydro peroxide, 2,4-dichrolobenzoil peroxide, 2,5-dimethyl-2,5-di(t-butylperoxy)hexane, and 2,5-dimethylhexane-2,5-di(peroxyl benzoate). Such a vulcanizer can be used in an amount of, for example, approximately 1 to 20 phr.

Examples of a phenol resin-based vulcanizer include: a brominated alkylphenol resin; a mixed cross-linked system including a halogen donner such as tin chloride and chloroprene, and an alkylphenol resin. Such a vulcanizer can be used in an amount of, for example, approximately 1 to 20 phr. Other examples include zinc white (approximately 5 phr), magnesium oxide (approximately 4 phr), lead oxide (approximately 10 to 20 phr), p-quinonedioxime (approximately 2 to 10 phr), p-dibenzoil quinonedioxime (approximately 2 to 10 phr), tetrachloro-p-benzoquin (approximately 2 to 10 phr), poly-p-dinitrosobenzene (approximately 2 to 10 phr), and methylenedianiline (approximately 0.2 to 10 phr).

As necessary, a vulcanization accelerator may be added. Examples of a vulcanization accelerator are aldehyde-ammonia-based, guanidine-based, thiazole-based, sulfenamide-based, thiuram-based, dithioic acid salt-based, and thiourea-based vulcanization accelerators which are generally available. The amount of the vulcanization accelerator used is for example, approximately 0.5 to 2 phr. Specifically, an example of the aldehyde-ammonia-based vulcanization accelerator is hexamethylenetetramine. An example of the guanidine-based vulcanization accelerator is diphenylguanidine. Some examples of the thiazole-based vulcanization accelerator include dibenzothiazyl disulfide (DM), 2-mercaptobenzothiazole and its Zn salt, and cyclohexylamine salt. Some examples of the sulfenamide-based vulcanization accelerator include cyclohexyl benzothiazyl sulfonamide (CBS), N-oxydiethylenebenzothiazyl-2-sulfenamide, N-t-butyl-2-benzothiazol sulfonamide, and 2-(thymol polynyl dithio)benzothizole. Some examples of the thiuram-based vulcanization accelerator include tetramethyl thiuram disulfide (TMTD), tetraethyl tiuram disulfide, tetramethyl tiuram monosulfide (TMTD), and dipenthamethylene thiuram tetrasulfide. Some examples of the dithioic acid salt-based vulcanization accelerator include Zn-dimethyl dithiocarbamate, Zn-diethyl dithiocarbamate, Zn-di-n-buthyl dithiocarbamate, Zn-ethylphenyl dithiocarbamate, Te-diethyl dithiocarbamate, Cu-dimethyl dithiocarbamate, Fe-dimethyl dithiocarbamate, and pipecoline pipecolyl dithiocarbamate. Some examples of the thiourea-based vulcanization accelerator include ethylene thiourea and diethyl thiourea.

Additionally, a vulcanization accelerator assistant which is generally-used for a rubber can also be used. For some examples of the vulcanization accelerator assistant include: zinc white (approximately 5 phr); and stearic acid, oleic acid and their Zn salts (approximately 2 to 4 phr). The method for producing the thermoplastic elastomer composition is as follows. The thermoplastic resin component and the elastomer component (unvulcanized one in the case of rubber) are melt-kneaded in advance by a bi-axial kneader/extruder or the like. The elastomer component is dispersed as a dispersion phase (domain) in the thermoplastic resin forming a continuous phase (matrix). When the elastomer component is vulcanized, the vulcanizer can be added during the kneading process to dynamically vulcanize the elastomer component. Although the various compounding agents (except for vulcanizer) may be added to the thermoplastic resin or the elastomer component during the kneading process, it is preferable to premix the compounding agents before the kneading process. The kneader used for kneading the thermoplastic resin and the elastomer component is not particularly limited. For example, a screw extruder, kneader, Banbury Mixer, bi-axial kneader/extruder, or the like can be used as the kneader. Among these, a bi-axial kneader/extruder is preferably used for kneading the thermoplastic resin and the elastomer component and for dynamically vulcanizing the elastomer component. Furthermore, two or more types of kneaders can be used to successively knead the thermoplastic resin and the elastomer component. As the condition for the melt kneading, the temperature should be at a temperature at which the thermoplastic resin melts or at a higher temperature. The shear rate at the time of kneading is preferably 1000 to 7500 $sec^{-1}$. The overall kneading time is 30 seconds to 10 minutes. When the vulcanizer is added, the vulcanization time after the addition is preferably 15 seconds to 5 minutes. The thermoplastic elastomer composition produced by the above method can be formed into a desired film shape by a generally-used method for forming a thermoplastic resin such as injection molding and extrusion molding.

The thermoplastic elastomer composition thus obtained has a structure in which the elastomer component (B) is dispersed as a discontinuous phase in the matrix of the thermoplastic resin (A). By adopting such a structure, the thermoplastic elastomer composition can give sufficient flexibility to the film. Meanwhile, the effect that the resin layer has as the continuous phase can give sufficient rigidity to the film. Furthermore, it becomes possible to obtain, in molding, a molding processability equivalent to the case of a thermoplastic resin regardless of the amount of elastomer component.

There are various ways of bonding the inner liner layer 10 to other adjacent tire component members. In an exemplar method, an adhesive agent is applied to the inner liner layer 10 and/or the counterpart member, and then the bonding is accomplished by the heat and the pressure applied while the tire is formed through vulcanization. The adhesive agent used for this purpose is obtained by solving a polymer and a cross-linking agent. Some examples of the polymer include an ordinary rubber-based polymer, a phenol resin-based polymer, an acrylic copolymer-based polymer, an isocyanate-based polymer. In an alternative method, a multi-layered laminate is fabricated by either extruding the film together with an adhesive resin, or the multilayered laminate is bonded to the adjacent tire component member during the vulcanization process. Some examples of the adhesive resin include styrene butadiene styrene copolymer (SBS), ethylene ethyl acrylate (EEA), and styrene ethylene butylene block copolymer (SEBS). Some examples of solvent-based adhesive agent include a phenol resin-based adhesive agent (Chemlok® 220 manufactured by Lord Corporation), a chlorinated rubber-based adhesive agent (Chemlok® 205 and Chemlok® 234B), and an isocyanate-based adhesive agent (Chemlok® 402).

As has been described in the embodiment, the present invention can be applied to the inner liner layer 10 made of either a thermoplastic resin or a thermoplastic elastomer composition. The present invention, however, is not limited to this application. The present invention can be applied to any tire component members as long as the tire component member is made of any of a thermoplastic resin and a thermoplastic elastomer composition that suffer from similar problems.

Among various types of tires, the present invention can be favorably applied to a tire with a lift-deformation ratio exceeding 160%, such as a high profile tire, a heavy-load tire, an aircraft tire, and a construction vehicle tire.

EXAMPLES

A green tire with a configuration shown in FIG. 1 (except that the inner liner layer had only two layers) was formed in accordance with the following specifications. The tire size was 255/45R18. The inner liner layer was made of a thermoplastic elastomer composition. The thermoplastic elastomer composition was made by blending nylon 6/66 copolymer (MILAN® CM6001 manufactured by Toray Industries, Inc.) and the bromide of isobutylene/para methylstyrene copolymer (MDX90-10 manufactured by ExxonMobil Chemical Inc.). The inner layer included the innermost layer having a thickness of 100 µm and the second layer having a thickness of 150 µm. Each of the two layers had a modulus of elasticity of 100 MPa. The radial expansion ratio of the making drum was 160% at the time when the second layer was attached. This method of forming a green tire will be referred to as Method 1 of the present invention.

Another green tire with a configuration shown in FIG. 1 (except that the inner liner layer had only two layers) was formed in accordance with the following specifications. The tire size was the same as the one described above. The inner liner layer included the innermost layer having a modulus of elasticity of 100 MPa and the second layer having a modulus of elasticity of 200 MPa. Each of the two layers had a thickness of 100 µm. The radial expansion ratio of the making drum was 160% at the time when the second layer was attached. This method of forming a green tire will be referred to as Method 2 of the present invention. Both the innermost layer and the second layer were made of the same thermoplastic elastomer composition as the one described above. However, the nylon 6/66 copolymer and the bromide of isobutylene/para methylstyrene copolymer were blended at different blending proportion from the one in the above-described case so as to adjust the moduli of elasticity at the values mentioned above.

The inner liner layer thus fabricated in each green tire was checked for the presence or absence of the separation failure. Then, no separation failure of the inner liner layer was found in each green tire and thus improvement in the separation failure was determined.

What is claimed is:

1. A pneumatic tire manufacturing method comprising forming a tube-shaped carcass band comprising an annular inner liner layer made of a thermoplastic resin and a thermoplastic elastomer composition produced by blending a thermoplastic resin component with an elastomer component and a carcass layer on a making drum,
    wherein the inner liner layer is formed of a plurality of layers comprising three layers stacked on one another, and
    mounting the innermost inner liner layer on the making drum and then expanding the innermost inner liner layer radially by a predetermined amount,
    wrapping a second inner liner layer directly on the outer circumference of the inner most liner layer and then expanding the second liner layer radially by a predetermined amount,
    wrapping a third inner liner layer directly on the outer circumference of the second liner layer and then expanding the third liner layer radially by a predetermined amount, and then mounting the carcass layer on the third inner liner layer to form the carcass band mounting the carcass band on a shaping drum and then expanding the carcass band to form a green tire.

2. The pneumatic tire manufacturing method according to claim 1 wherein among the plurality of layers, a layer located on an outer side has a larger thickness.

3. The pneumatic tire manufacturing method according to claim 2
    wherein the radial expansion ratio of the carcass band is not lower than 160% measured in an innermost layer of the inner liner layer, and
    the innermost layer has a thickness of not larger than 150 µm.

4. The pneumatic tire manufacturing method according to claim 3 wherein the radial expansion ratio of the making drum is not higher than 130% of the radius of the making drum in a state where the innermost layer is attached to the making drum.

5. The pneumatic tire manufacturing method according to claim 4 wherein among the plurality of layers, a layer on an outer side has a higher modulus of elasticity.

6. The pneumatic tire manufacturing method according to claim 3 wherein among the plurality of layers, a layer on an outer side has a higher modulus of elasticity.

7. The pneumatic tire manufacturing method according to claim 2 wherein the radial expansion ratio of the making drum is not higher than 130% of the radius of the making drum in a state where the innermost layer is attached to the making drum.

8. The pneumatic tire manufacturing method according to claim 2 wherein among the plurality of layers, a layer on an outer side has a higher modulus of elasticity.

9. The pneumatic tire manufacturing method according to claim 7 wherein among the plurality of layers, a layer on an outer side has a higher modulus of elasticity.

10. The pneumatic tire manufacturing method according to claim 1
    wherein the radial expansion ratio of the carcass band is not lower than 160% measured in an innermost layer of the inner liner layer, and
    the innermost layer has a thickness of not larger than 150 µm.

11. The pneumatic tire manufacturing method according to claim 10 wherein the radial expansion ratio of the making drum is not higher than 130% of the radius of the making drum in a state where the innermost layer is attached to the making drum.

12. The pneumatic tire manufacturing method according to claim 11 wherein among the plurality of layers, a layer on an outer side has a higher modulus of elasticity.

13. The pneumatic tire manufacturing method according to claim 10 wherein among the plurality of layers, a layer on an outer side has a higher modulus of elasticity.

14. The pneumatic tire manufacturing method according to claim 1 wherein the radial expansion ratio of the making drum is not higher than 130% of the radius of the making drum in a state where the innermost layer is attached to the making drum.

15. The pneumatic tire manufacturing method according to claim 14 wherein among the plurality of layers, a layer on an outer side has a higher modulus of elasticity.

16. The pneumatic tire manufacturing method according to claim 1 wherein among the plurality of layers, a layer on an outer side has a higher modulus of elasticity.

17. The pneumatic tire manufacturing method according to claim 1 wherein said plurality of layers comprises more than four layers.

* * * * *